US009722409B2

(12) United States Patent
Janisch

(10) Patent No.: US 9,722,409 B2
(45) Date of Patent: Aug. 1, 2017

(54) SELECTIVITY MODULE WITH SERIAL STATUS SIGNAL

(75) Inventor: Heiko Janisch, Braunsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 576 days.

(21) Appl. No.: 14/361,935

(22) PCT Filed: Dec. 1, 2011

(86) PCT No.: PCT/EP2011/071481

§ 371 (c)(1), (2), (4) Date: Sep. 2, 2014

(87) PCT Pub. No.: WO2013/079110

PCT Pub. Date: Jun. 6, 2013

(65) Prior Publication Data

US 2015/0180218 A1 Jun. 25, 2015

(51) Int. Cl.

| | |
|---|---|
| ***H02H 3/02*** | (2006.01) |
| ***H01H 9/16*** | (2006.01) |
| ***H02H 1/00*** | (2006.01) |
| ***H02J 13/00*** | (2006.01) |
| *H02H 3/087* | (2006.01) |

(52) U.S. Cl.

CPC .............. *H02H 3/02* (2013.01); *H01H 9/167* (2013.01); *H02H 1/0061* (2013.01); *H02J 13/0003* (2013.01); *H02H 3/087* (2013.01); *Y02B 90/228* (2013.01); *Y04S 20/18* (2013.01); *Y10T 307/747* (2015.04)

(58) Field of Classification Search

None

See application file for complete search history.

(56) References Cited

U.S. PATENT DOCUMENTS

| | | | | |
|---|---|---|---|---|
| 5,170,310 | A | 12/1992 | Fixemer | |
| 7,119,457 | B1 * | 10/2006 | Flegel | H02J 3/14 307/64 |
| 2003/0033119 | A1 | 2/2003 | Noh | |
| 2003/0216876 | A1 * | 11/2003 | Premerlani | G06F 1/12 702/58 |
| 2003/0225481 | A1 * | 12/2003 | Sealing | G06F 1/12 700/286 |

* cited by examiner

*Primary Examiner* — Jared Fureman
*Assistant Examiner* — Aqeel Bukhari
(74) *Attorney, Agent, or Firm* — Cozen O'Connor

(57) ABSTRACT

A selectivity module for dividing a load current in an installation system includes a housing, a plurality of branches in the housing, a plurality of switching devices, and a control unit. Each of the plurality of switching devices is configured for switching a branch current on and off in a corresponding one of the plurality of branches. The plurality of switching devices serves to output information about corresponding switching states. The control unit is connected to the plurality of switching devices and configured to output a status signal as a function of the output information from the plurality of switching devices. The output information relating to the individual switching states of all of the plurality of switching devices is contained in the status signal in a serial encoded form.

10 Claims, 2 Drawing Sheets

7
1
3
+
24V
−
~
=
4
K1
K2
K3
K4
Z2 Z3 Z4
5
Z1
S1
S2
S3
S4
6 2
8
A1
A2
A3
A4
L1
L2
L3
L4

1
2
3
4
5
6
7
8
+
24V
−
~
=
K1
K2
K3
K4
S1
S2
S3
S4
A1
A2
A3
A4
L1
L2
L3
L4
Z1
Z2
Z3
Z4

SELECTIVITY MODULE WITH SERIAL STATUS SIGNAL

CROSS-REFERENCE OF RELATED APPLICATIONS

This is U.S. national stage of PCT Application No. PCT/EP2011/071481, filed on Dec. 1, 2011, which is hereby incorporated herein in its entirety by reference.

FIELD OF INVENTION

The present invention relates to a selectivity module for dividing a load current in an installation system having a housing, a plurality of branches in the housing, and one switching device in each branch for switching a branch current on and off. In addition, the present invention relates to a method for providing a status signal of a selectivity module of the type.

DESCRIPTION OF THE RELATED ART

A selectivity module, which can also be referred to as a diagnostic module, serves for dividing a load current in an installation system. For example, PSE 200U, a selectivity module manufactured by Siemens Aktiengesellschaft, splits the load current between a plurality of 24V branches and reliably monitors the branches for overload and short-circuits. The electronics of the selectivity module tolerates transient current peaks, caused by, e.g., high inrush currents, while electrically isolating branches affected by a more persistent overload. This is ensured even on high-impedance lines and in the event of "creeping" short-circuits. In such cases, miniature circuit breakers fail to trip, or trip too late, even if the power supply unit were able to deliver the required tripping current. The selectivity module has for example four branches, which can also be referred to as channels. In each channel there is a switching device which switches the respective channel on or off, as a result of which the corresponding branch current flows or does not flow.

With regard to the overall system, it is for example necessary within the context of a diagnosis to identify which channels of the selectivity module have been tripped (i.e., switched off). The cited diagnostic and selectivity module possesses only a single floating relay contact for aggregate fault reporting. In other words, the status messages of the individual switching devices are combined and the only information delivered to the outside by the selectivity module is that one of the channels has tripped. In this case it is not possible to distinguish whether one or more than one channel has tripped. If a channel-specific evaluation is required, each channel must be monitored individually based on a digital input provided by, e.g., a programmable logic controller (PLC) or a data processing device and thus would require a controller or device for each of the four input channels.

U.S. Pat. No. 5,170,310 discloses a switch-off device with two branch switches and a main switch. A control unit manages the branch switches on the basis of current and voltage monitoring in the branches and in this way acts upon faulty states in, the branches.

SUMMARY OF THE INVENTION

An object of the present invention is to provide a selectivity module which is simple in terms of its construction and in which the status of the individual channels can be output in a more differentiated manner. In addition, a corresponding method for providing a status signal of a selectivity module is disclosed.

This object is achieved according to a selectivity module of the claimed invention, wherein the selectivity module includes a control unit and a plurality of switching devices. Each of the switching devices serves to output information about a corresponding switching state. The control unit is connected to the switching devices and configured for outputting a status signal as a function of the information from the switching devices. The information relating to the individual switching states of all of the switching devices is contained in the status signal in serial encoded form.

Additionally disclosed according to the invention is a method for providing a status signal of a selectivity module adapted for dividing a load current in an installation system, wherein the selectivity module has a housing, a plurality of branches in the housing, and a switching device in each branch for switching a branch current on and off. The method includes outputting by each of the switching devices one piece of information that indicates the respective switching state. The method also includes providing a status signal as a function of the information from the switching devices, wherein the information about the individual switching states of all of the switching devices is contained in the status signal in serial encoded form.

Advantageously, the information about the individual switching states of all of the switching devices is therefore contained in the status signal in serial encoded form, e.g., a data word. As a result, only a single digital output is required in the selectivity module in order to communicate the states of all of the channels or switching devices to the outside. Similarly, a programmable logic controller (PLC), for example, which picks up the status signal, needs only a single digital input in order to evaluate the states of the individual switching devices of the selectivity module in a differentiated manner.

Preferably, the status signal conforms to a protocol, and the protocol is variable. This enables the status signal to be adapted to different applications. It is furthermore favorable if the information relating to the individual switching states is represented in the status signal in binary form in each case. A simple binary evaluation can be realized in this way.

It is of advantage in one embodiment that the status signal has a plurality of sequential information blocks in which one bit for each of the switching devices in each case characterizes the information relating to the switching state of the respective switching device, thereby it can be reliably established on the basis of a single bit whether the respective switching device is in a switched-on or switched-off state.

The information blocks in the status signal can succeed one another periodically. In this way an evaluation device connected downstream can for example instantly detect an interruption to the selectivity module, in which case the information blocks will no longer arrive periodically.

In another embodiment, each information block has a start bit, which signals the start of the information block, and a stop bit, which signals the end of the information block. The individual status bits between the start bit and the stop bit can then be reliably evaluated. A predefined interval time can exist between each two succeeding information blocks. This means that the pulse length of all of the bits, whether status bits, start bit or stop bit, can be the same, and yet the start and end of an information block can be reliably identified.

Alternatively, each information block can have a start bit, wherein the status bits of the information block each possesses the same predefined first temporal duration, and the start bit has a second temporal duration that is different from the first temporal duration. In this way it is possible to dispense with intervals between two information blocks, such that in the status signal a first of the information blocks is followed immediately in time by a second of the information blocks. The information density can be increased as a result. Furthermore, with this signal arrangement, it is also possible to do without a stop bit.

BRIEF DESCRIPTION OF THE DRAWINGS

The present invention will now be explained in more detail with reference to the attached drawings, in which.

DETAILED DESCRIPTION OF THE PRESENTLY PREFERRED EMBODIMENTS

The exemplary embodiments described in more detail below represent presently preferred embodiments of the present invention.

Figure 1:
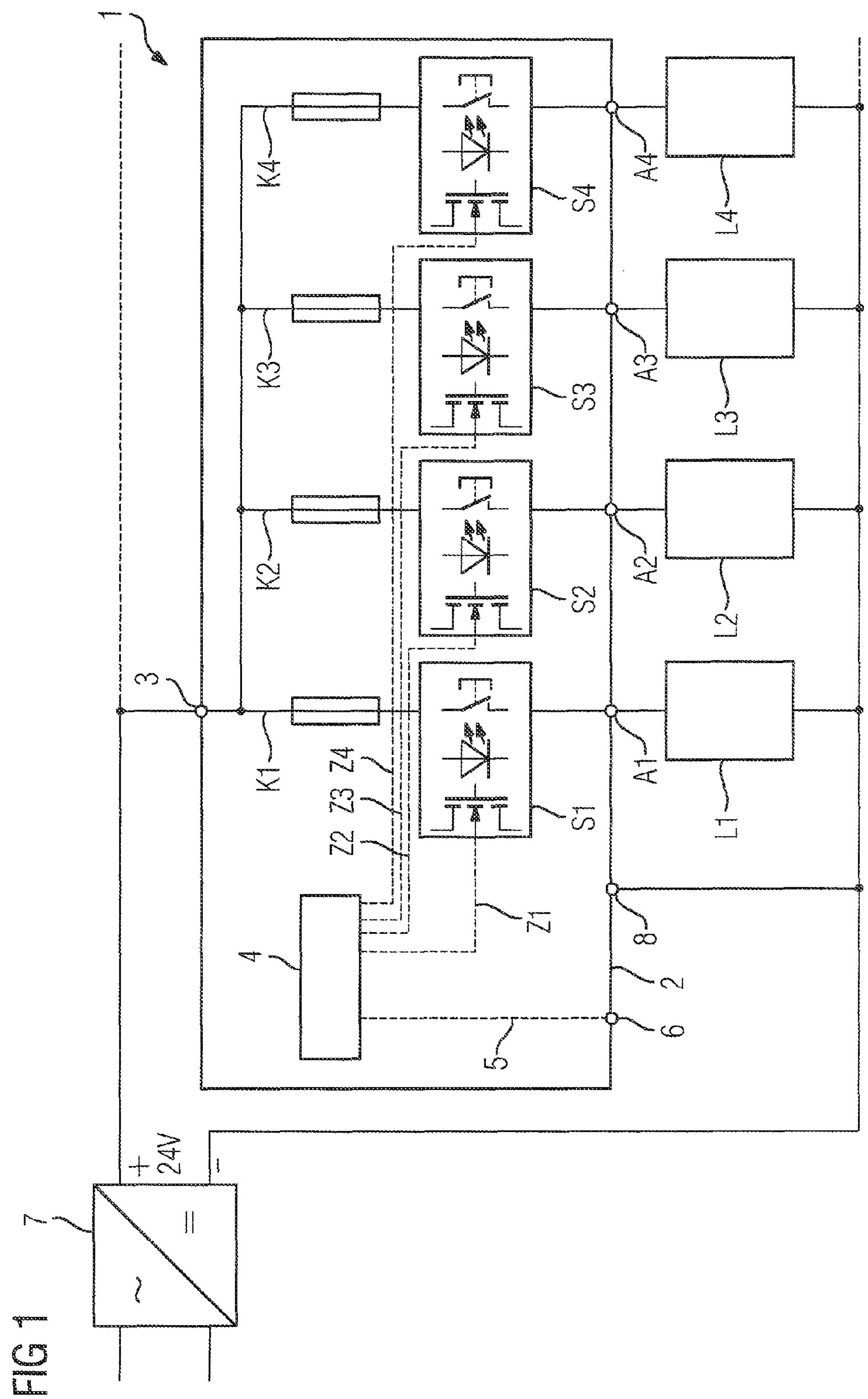
FIG. 1 is a schematic block circuit diagram of a selectivity module with wiring configuration according to one embodiment of the invention.

FIG. 1 depicts a selectivity module 1 having a housing 2. In the present example, four switching devices S1, S2, S3 and S4 are arranged in the housing 2. Each of the switching devices is assigned to a channel K1, K2, K3 and K4. A module input 3 is connected to all of the channels K1 to K4. Each of the switching devices S1 to S4 is therefore connected to the module input 3 on the input side. On the output side, each of the switching devices S1 to S4 possesses a separate output A1, A2, A3 and A4 which simultaneously represents a module output in each case and thus an electrical interface on the housing 2 of the selectivity module 1.

Each of the switching devices S1 to S4 can assume a switched-on state and a switched-off state. If, for example, a defined overload current or a defined short-circuit current flows through a switching device, then the switching device switches off, i.e., the channel has tripped.

Each switching device S1 to S4 supplies information relating to the respective switching state via a status signal line Z1, Z2, Z3 and Z4 to a control logic unit 4 which is likewise integrated into the housing 2. The control logic unit 4 processes the status information of the individual switching devices S1 to S4 into a serial encoded status signal. The serial encoded signal therefore contains information about all states of the switching devices S1 to S4. The status signal is provided at a module output 6 via an output line 5.

In the wired state shown in FIG. 1, the selectivity module 1 is connected on the input side, i.e., by means of its module input 3, to for example the plus rail of a rectifier 7, which in one embodiment supplies a direct-current voltage of 24V. The minus rail of the rectifier 7 is connected to a further input 8 of the selectivity module 1, the further wiring of which in the interior of the housing 2 is not shown here for clarity of illustration reasons. Loads L1, L2, L3 and L4 are each connected individually to the outputs A1 to A4, respectively, of the selectivity module 1. The loads L1 to L4 are jointly connected on the other side to the minus rail of the rectifier 7. In this way a plurality of selectivity modules can be connected in parallel to the rectifier 7 or to a corresponding current source.

For the purpose of evaluating the states of the channels K1 to K4 or, as the case may be, of the switching devices S1 to S4, the module output 6 is connected for example to a programmable logic controller (PLC) or a corresponding data processing device. For clarity of illustration reasons, such a PLC or data processing device is not shown in FIG. 1.

Accordingly, it is therefore possible to describe the states of the individual channels K1 to K4 that are to be monitored by outputting a serial data word. The states of the individual channels are encoded in the data word and can thus be processed further in the PLC or the data processing device.

The states of the individual channels K1 to K4 that are to be monitored or, as the case may be, of the switching devices S1 to S4 can be sensed individually, i.e., on a channel-specific basis, and processed further. Only a single digital input of a controller connected downstream of the selectivity module is required for this purpose. In this way it is possible to implement complex system parts very inexpensively and easily in automation solutions.

This type of status communication is characterized in that it can employ a very simple protocol which is easy to generate. Further processing of these signals can be accomplished at low cost with modest investment of effort using simple digital inputs and a corresponding processing module in the processing program. In particular, this means, with reference to the example of FIG. 1, that there is no requirement for four separate digital inputs of a PLC for one module, as is the case with selectivity modules known in the art. This results in lower costs for the wiring and the requisite digital inputs of the PLC. The protocol is scalable, i.e., variable, and can therefore be adapted to many applications in the power supply equipment environment.

In one embodiment, the output 6 of the selectivity module 1 can be realized using an optocoupler or switching transistor. Compared to mechanical relays, these are characterized by their resistance to wear and tear. In principle, however, annunciator relays can also be provided at the output 6, if necessary.

Figure 2:
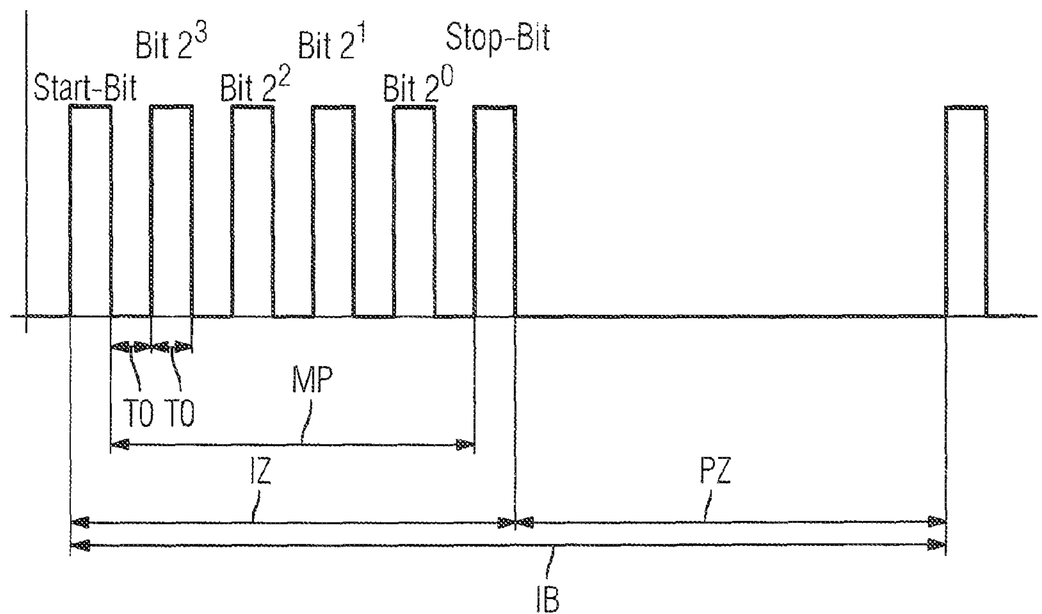
FIG. 2 shows a signal pattern of a status signal according to a first embodiment variant of the invention.

The concrete form of a status signal, namely a serial pulse sequence, is shown in FIG. 2. Specifically, FIG. 2 shows a detail of a periodic status signal. A period corresponds to the duration of one information block IB. An information block 1B contains the information relating to all states of the channels or switching devices of the selectivity module. In one embodiment (as shown in FIG. 2), the information block IB is subdivided into an information time IZ and an interval time PZ. In one embodiment, both IZ and PZ can be 2200 milliseconds (ms) in length. The information time IZ begins with a start bit and ends with a stop bit. Located between the start and stop bits in this case are four bits having the significances $2^3$, $2^2$, $2^1$ and $2^0$. In this example, each bit has a temporal duration of T0.

An interval equal to the duration of T0 is interposed in each case between two adjacent bits. Each bit possesses a signal value corresponding to the bit value. For example, the signal value in the case of the bit value one corresponds to a predefined level, and is similarly zero for the bit value zero. If all the status bits in the example of FIG. 2 are zero, then a maximum interval MP results between the start bit and the stop bit. The maximum interval MP in the information time IZ can amount for example to 1800 ms if the duration T0 is 200 ms. The interval time PZ (2200 ms) is, therefore, defined longer than the maximum interval MP within the information time 1Z when all information bits are zero. As a result, it is always possible to differentiate between interval time PZ and information time IZ.

The times chosen in the example of FIG. 2 can also be processed by a "slow" PLC having a single digital input. The reason for this is that the level time is 200 ms long and, therefore, significantly longer than the typical cycle time of a PLC.

Figure 3:
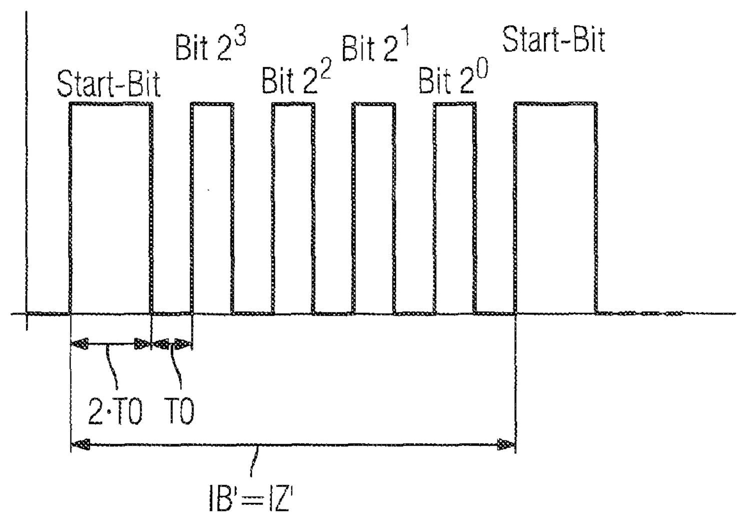
FIG. 3 shows a signal pattern of a status signal according to a second embodiment variant of the invention.

The status signal of FIG. 2 conforms to a predetermined protocol. The predetermined protocol can, however, be varied for a different application. An example in this regard is shown in FIG. 3. According to the protocol there, use is once again made of periodically transmitted information blocks IB'. Each information block IB' begins with a start bit. In this example, the width of a start bit is double that of the start bit of FIG. 2. The start bit, therefore, has a width of 2·T0 (e.g. 400 ms). In other words, a start bit has from the outset a predefined non-zero signal value which is constant up to the end of the bit.

In this case, there are once again four status bits between two start bits, the status bits representing the states of the four channels of the selectivity module of FIG. 1. Each status bit possesses the same structure as in the example of FIG. 2.

The length of an information block IB' therefore corresponds in this case to the length of an information time IZ'. An advantage, when compared with the variant shown in FIG. 2, therefore, includes the halving of the cycle (refresh) time. This is made possible here by the fact that a start bit and a status bit possess level (adjustment) times of different length. In the example, the non-zero level in the start bit is twice as long as in the status or information bit.

The protocol for the status signal can be further varied. For example, the structure of an individual bit can be modified. Furthermore, the levels can also be inverted. In addition, a selectivity module can also possess a different number of channels, e.g., two, three, five, etc., as a result of which the information blocks become correspondingly shorter or longer compared to the illustrated example with four channels.

The binary status signal can be used, for example, for a signal encoding scheme as shown in Table 1.

TABLE 1

| Signal encoding | | | | | |
|---|---|---|---|---|---|
| | Bit $2^3$ | Bit $2^2$ | Bit $2^1$ | Bit $2^0$ | Value |
| Channel | A | B | C | D | |
| | 0 | 0 | 0 | 0 | 0 |
| | 0 | 0 | 0 | 1 | 1 |
| | 0 | 0 | 1 | 0 | 2 |
| | 0 | 0 | 1 | 1 | 3 |
| | 0 | 1 | 0 | 0 | 4 |
| | 0 | 1 | 0 | 1 | 5 |
| | 0 | 1 | 1 | 0 | 6 |
| | 0 | 1 | 1 | 1 | 7 |
| | 1 | 0 | 0 | 0 | 8 |
| | 1 | 0 | 0 | 1 | 9 |
| | 1 | 0 | 1 | 0 | 10 |
| | 1 | 0 | 1 | 1 | 11 |
| | 1 | 1 | 0 | 0 | 12 |
| | 1 | 1 | 0 | 1 | 13 |
| | 1 | 1 | 1 | 0 | 14 |
| | 1 | 1 | 1 | 1 | 15 |

According to this signal encoding scheme, the status of the selectivity module having the four channels can be uniquely represented in a numeric value (0 to 15) from the status or information bits set in each case. Thus, the numeric value zero corresponds to the case when none of the four channels has tripped. The numeric value four corresponds to the case when only channel B has tripped. Furthermore, the numeric value 11 corresponds to the case when channels A, C and D have tripped, and the numeric value 15 corresponds to the case when all channels have tripped.

The data word representing this decimal numeric value can be evaluated and processed further in any PLC. In the example of FIG. 2, the cyclic updating of the numeric value takes place every 4.4 seconds (s), and every 2.2 s in the example of FIG. 3.

Advantageously, a direct assignment of the output status information to the channels is possible by virtue of the serial encoded status signal, thereby enabling possible downtimes of a system to be reduced. Furthermore, a wire break or an interruption to the connection between the selectivity module and a connected PLC can be more reliably detected if the signal transmission takes place cyclically. The PLC can therefore respond accordingly to the absence of the status signal.

It should be emphasized once again as a further advantage over selectivity modules according to the prior art that only a single digital input of a PLC is necessary in order to evaluate the states of a selectivity module. The necessary wiring outlay is also correspondingly reduced, for which reason commensurate cost savings are expected.

The series of detailed descriptions set forth above are only specific descriptions directed to the feasible embodiments of the present invention, and are not intended to limit the scope of protection of the present invention; and all the equivalent embodiments or modifications made without departing from the technical spirit of the present invention shall be included in the scope of protection of the present invention.

What is claimed is:

1. A selectivity module for dividing a load current in an installation system, comprising:

a housing;

a plurality of branches in the housing of the selectivity module;

a plurality of switching devices; and a control unit, wherein each of the plurality of switching devices in the housing of the selectivity module is configured to switch a branch current on and off in a corresponding one of the plurality of branches;

wherein the plurality of switching devices serve to output information about corresponding switching states;

wherein the control unit is directly connected to each of the plurality of switching devices and is configured to output a status signal via status lines as a function of the output information from the plurality of switching devices in the housing of the selectivity module; and wherein the output information relating to the individual switching states of all of the plurality of switching devices in the housing of the selectivity module is contained in the status signal in a serial encoded form.

2. The selectivity module of claim 1, wherein the status signal conforms to a protocol and the protocol is variable.

3. The selectivity module of claim 1, wherein the output information relating to the individual switching states is represented in the status signal in binary form.

4. The selectivity module of claim 3, wherein the status signal has a plurality of sequential information blocks in which one status bit for each of the switching devices characterizes the information relating to the switching state of the respective switching device.

5. The selectivity module of claim 4, wherein the information blocks in the status signal succeed one another periodically.

6. The selectivity module of claim 4, wherein each of the plurality of sequential information block has a start bit, which signals the start of the information block, and a stop bit, which signals the end of the information block.

7. The selectivity module of claim 4, wherein a predefined interval time exists between each two succeeding information blocks of the plurality of sequential information block.

8. The selectivity module of claim 4, wherein each of the plurality of sequential information block has a start bit, wherein the status bits of the information block each possess a predefined first temporal duration; and wherein the start bit has a second temporal duration that is different from the predefined first temporal duration.

9. The selectivity module of claim 8, wherein one of the plurality of sequential information blocks in the status signal is followed immediately in time by a second of the information blocks.

10. A method for providing a status signal of a selectivity module configured for dividing a load current in an installation system, wherein the selectivity module includes a housing, a plurality of branches in the housing, and a plurality of switching devices each configured for switching a branch current on and off in a corresponding branch, the method comprising the following steps:

outputting, at each of the plurality of switching devices of the selectivity module, information that indicates the switching state of a corresponding branch; and providing a status signal as a function of the information from the switching devices of the selectivity module;

wherein the information about the individual switching states of all of the plurality of switching devices of the selectivity module is contained in a serial encoded form in the status signal.

* * * * *